United States Patent Office 3,066,049
Patented Nov. 27, 1962

3,066,049
NON-CRYSTALLIZING DEXTROSE LIQUOR
Edward C. Snyder, Hinsdale, and John E. Wolfer, Jr., Pekin, Ill., assignors to Corn Products Company, New York, N.Y., a corporation of Delaware
No Drawing. Filed June 8, 1960, Ser. No. 34,612
2 Claims. (Cl. 127—38)

This invention relates to the manufacture of a non-crystallizing starch hydrolyzate liquor having a D.E. value within the range of about 65 to about 75 percent.

Starch hydrolyzates or dextrose liquors having D.E. values above about 65 percent if made by the usual or known procedures are applicable for use in industries such as the tanning industry but they have the disadvantage that sooner or later they will crystallize. High D.E. starch hydrolysis products are well known but are usually marketed in billet or chipped form. It is a generally accepted rule in the starch industry that starch hydrolyzates having a D.E. value greater than 65 at a commercial Baumé of 42–43° (or a dextrose content, dry basis, greater than 39–40 percent) will crystallize. There are a number of melassigenic agents present in the hydrolyzates, particularly greens or hydrol, which tend to slow up crystallization but eventually all of these liquors will crystallize.

Liquid or non-crystallizing high D.E. products have several obvious advantages over solid, crystallized products in that the costs of crystallizing, chipping and bagging are avoided. Also, liquid products are in a more convenient form for the ultimate user since the time and expense of unloading and dissolving solid products are avoided.

Several methods have been proposed for rendering starch hydrolyzates or dextrose liquors non-crystallizable. For example, in U.S. Patents 2,610,930 and 2,767,109 such liquors are subjected to an acid-heat treatment and in U.S. Patent 2,770,562 they are subjected to treatment with ammonia. In Patent 2,770,562 mention is made of the fact that addition agents, such as pasted starch and dextrin, have been used to prevent crystallization of dextrose but being effective only in large amounts the cost is too great. Furthermore, their presence is considered objectionable for some uses, such as weighting sole leather.

It is the main object of this invention to provide a process for the manufacture of non-crystallizing starch hydrolyzates from starch hydrolyzates having initial D.E. values within the range of about 60 to about 90 percent. Other objects will appear hereinafter. By the term "starch hydrolyzates" we intend to include liquors obtained by hydrolysis of starch in known manner, by-product liquors from dextrose manufacturing processes, e.g., greens, hydrol and dextrose solutions and various combinations of these having a D.E. value within the aforementioned range.

The invention comprises mixing up to 30 percent, dry basis, of starch with a starch hydrolyzate having a D.E. value of about 60 to about 90 percent, adjusting the pH of the resultant mixture to about 1 to about 2 and thereafter heating the mixture until the D.E. reaches about 65 to about 75 percent. Thereafter, the liquor is neutralized and refined in conventional manner.

The aforementioned process has a number of advantages over prior art processes. The resultant liquor has less ash and there is less refining required than in the prior art. In the prior art, the greens or hydrol used as starting material contain the ash from the neutralization of the converting acid and this is avoided in our process. Furthermore, there is only one neutralization step in our process while prior art processes have two such steps.

The color formed during our treatment is generally less than in prior products probably because the hydrolyzate-starch mixture has a dextrose content and D.E. level lower than the hydrolyzate alone. It is well known that in general, color formation in starch hydrolyzates increases in severity as the D.E. level is increased, a phenomenon which may be due to the formation of color generating compounds from dextrose which occurs under the acid conditions encountered in preparing non-crystallizing liquid products. In the present process, the addition of starch lowers the actual dextrose content of the mixture undergoing acid heat treatment so that fewer color generating compounds are formed.

In carrying out our process starch is blended with the starch hydrolyzate to produce a mixture having a gravity customarily used in converting starch or reverting greens, hydrol, etc. For practical operating conditions this may vary from about 30 to about 43–44° Bé. The pH is adjusted to 1, if not already within the range of about 1 to about 2, and then the mixture is subjected to the usual converting conditions, e.g., 15–30 lbs. pressure for 10–60 minutes, for hydrolyzing starch until the D.E. reaches a value within the range of 65 to 75 percent. Thereafter, the resultant liquor is neutralized, and refined in customary manner.

The following examples which are intended to be illustrative and informative and not in any way limiting the invention will further illustrate the invention.

EXAMPLE I

A plant run was made wherein starch was hydrolyzed with hydrochloric acid in conventional manner to produce an hydrolyzate having a D.E. value of 80 percent. To this hydrolyzate was added 12 percent, dry basis, of starch and the gravity of the mixture was adjusted to 38° Bé. The acidity of the mixture was adjusted to a pH of about 1.3–1.5 with hydrochloric acid. The mixture was heated at 22 lbs. pressure for 18 minutes. Thereafter, the liquor was neutralized, refined with carbon and evaporated to 41.8 Bé. in conventional manner. The final D.E. value and the dextrose content of the refined liquor were 71.7 and 57.9 percent respectively. This liquor was stable against crystallization for over four months.

EXAMPLE II

Several laboratory experiments were carried out by adding different amounts of starch to a starch hydrolyzate with a D.E. value of 85 percent and the gravity of the resulting mixtures was adjusted to 38 Bé. The pH values of the mixtures were adjusted to about 1.0 with hydrochloric acid and then the mixtures were heated at 20 lbs. pressure for 60 minutes. Thereafter, the products were neutralized, carbon refined and evaporated in customary manner. None of the products crystallized even after standing 150 days. The analyses of the products as well as those of the product from Example I are set forth in Table I.

Table I

| Example No. | Starch Added, Percent D.B. | Final Bé. | D.E., Percent | Dextrose, Percent D.B. | Disaccharide, Percent D.B. | Trisaccharide and Other Carbohydrates, D.B. |
|---|---|---|---|---|---|---|
| 1 | 12 | 41.8 | 71.7 | 57.9 | 25.1 | 17.0 |
| 2(a) | 15 | 41.8 | 68.7 | 50.8 | 26.9 | 22.3 |
| 1(b) | 20 | 41.7 | 69.1 | 52.2 | 26.8 | 21.0 |
| 2(c) | 30 | 42.3 | 71.3 | 55.0 | 27.1 | 17.9 |

The product of our invention is particularly useful in the tanning industry for weighting sole leather where it functions as a humectant in preventing leather from drying out. The use of lower D.E. corn syrup, i.e. below 65 D.E. for this purpose is practiced to a small degree but many leather processors believe that such syrups containing a relatively large proportion of dextrins contribute to "tinniness" or "brittleness" in finished leather. It is for this reason that the higher conversion products, i.e. D.E. 70–85, sold in solid form have been used to a much greater extent than the non-crystallizing corn syrups. However, as mentioned previously, these high D.E. products have the distinct disadvantage that they must be dissolved before using. The use of a liquid, non-crystallizing, high D.E. product, such as results from the practice of the present invention and which does not have to be dissolved before using, is, therefore, preferred and desired over the prior art solid products

We claim:

1. A process for preparing a non-crystallizable syrup which comprises: adding about 10 to 30 percent starch, dry basis, to a starch hydrolyzate liquor having a D.E. value within the range of about 60 to about 90 percent; subjecting the resultant mixture to heat treatment, at a pH of about 1 to about 2, until the final D.E. value is within the range of about 65 to 75 percent; and thereafter neutralizing the liquor: whereby a syrup having a low ash and a low color content is produced.

2. Process according to claim 1 wherein the heat treatment is conducted at a pressure in the range of 15 to 30 p.s.i. for about 10 to about 60 minutes.

References Cited in the file of this patent

UNITED STATES PATENTS

| | | |
|---|---|---|
| 1,704,037 | Ebert | Mar. 5, 1929 |
| 2,767,109 | Fitzer | Oct. 16, 1956 |
| 2,770,562 | Fitzer | Nov. 13, 1956 |

OTHER REFERENCES

Kerr: Chemistry and Industry of Starch, 2nd ed., 1950, Academic Press Inc., N.Y., pages 378–379.

UNITED STATES PATENT OFFICE
CERTIFICATE OF CORRECTION

Patent No. 3,066,049            November 27, 1962

Edward C. Snyder et al.

It is hereby certified that error appears in the above numbered patent requiring correction and that the said Letters Patent should read as corrected below.

Column 2, Table I, column 1, lines 3 and 4 thereof, for "1(b)" and "2(c)" read -- (b) and (c) --.

Signed and sealed this 14th day of May 1963.

(SEAL)
Attest:

ERNEST W. SWIDER
Attesting Officer

DAVID L. LADD
Commissioner of Patents